(12) United States Patent
Mleczko et al.

(10) Patent No.: US 10,594,982 B2
(45) Date of Patent: *Mar. 17, 2020

(54) VEHICULAR CAMERA WITH COAXIAL CONNECTOR

(71) Applicant: MAGNA ELECTRONICS INC., Auburn Hills, MI (US)

(72) Inventors: Jamie A. Mleczko, Washington, MI (US); Jonathan D. Conger, Berkley, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/383,995

(22) Filed: Apr. 15, 2019

(65) Prior Publication Data

US 2019/0246069 A1 Aug. 8, 2019

Related U.S. Application Data

(63) Continuation of application No. 15/722,145, filed on Oct. 2, 2017, now Pat. No. 10,264,219.

(Continued)

(51) Int. Cl.
| | |
|---|---|
| *B60Q 1/00* | (2006.01) |
| *H04N 7/18* | (2006.01) |
| *B60N 2/00* | (2006.01) |
| *B60Q 1/14* | (2006.01) |
| *B60R 1/08* | (2006.01) |

(Continued)

(52) U.S. Cl.
CPC ............... *H04N 7/18* (2013.01); *B60N 2/002* (2013.01); *B60Q 1/1423* (2013.01); *B60Q 9/008* (2013.01); *B60R 1/088* (2013.01); *B60R 1/12* (2013.01); *B60R 11/04* (2013.01); *H04N 5/2257* (2013.01); *H04N 7/183* (2013.01); *H04N 13/239* (2018.05)

(58) Field of Classification Search
CPC ...... H04N 7/18; H04N 13/239; H04N 5/2257; H04N 7/183; B60N 2/002; B60Q 1/1423; B60Q 9/008; B60R 1/088; B60R 1/12; B60R 11/04
USPC .......................................................... 340/461
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |

(Continued)

*Primary Examiner* — Kerri L McNally
*Assistant Examiner* — Thang D Tran
(74) *Attorney, Agent, or Firm* — Honigman LLP

(57) ABSTRACT

A vehicular camera includes a front camera housing accommodating a lens and an imager, a rear camera housing, and a PCB. The PCB has first and second contacts that include respective first and second electrically conductive pads. A spring-loaded electrical connector is disposed at the rear camera housing and includes first and second terminals for connecting to respective ones of the first and second contacts at the PCB. As the rear camera housing is moved into engagement with the front camera housing, the terminals engage the contacts and compress towards a compressed state and, after the rear camera housing is attached at the front camera housing, are in spring-biased electrical connection with the contacts at the PCB. The electrical connector includes a connector end that is opposite the terminals and that is configured to electrically connect to a coaxial connector of a coaxial cable of a vehicle.

23 Claims, 6 Drawing Sheets

Related U.S. Application Data

(60) Provisional application No. 62/403,456, filed on Oct. 3, 2016.

(51) Int. Cl.
  *B60R 1/12* (2006.01)
  *B60R 11/04* (2006.01)
  *B60Q 9/00* (2006.01)
  *H04N 5/225* (2006.01)
  *H04N 13/239* (2018.01)

(56) References Cited

U.S. PATENT DOCUMENTS

| | | | |
|---|---|---|---|
| 5,791,911 A | 8/1998 | Fasano et al. | |
| 5,949,331 A | 9/1999 | Schofield et al. | |
| 7,965,336 B2 | 6/2011 | Bingle et al. | |
| 8,503,061 B2 | 8/2013 | Uken et al. | |
| 8,542,451 B2 | 9/2013 | Lu et al. | |
| 8,866,907 B2 | 10/2014 | McElroy et al. | |
| 9,066,446 B1 | 6/2015 | Olsson et al. | |
| 9,233,641 B2 | 1/2016 | Sesti et al. | |
| 9,609,757 B2 | 3/2017 | Steigerwald | |
| 9,623,799 B2 | 4/2017 | Bingle et al. | |
| 10,264,219 B2 | 4/2019 | Mleczko et al. | |
| 2001/0048215 A1 | 12/2001 | Breed et al. | |
| 2010/0097519 A1 | 4/2010 | Byrne et al. | |
| 2011/0310248 A1 | 12/2011 | McElroy et al. | |
| 2013/0107068 A1 | 5/2013 | Kim et al. | |
| 2013/0222595 A1 | 8/2013 | Gebauer et al. | |
| 2013/0242099 A1* | 9/2013 | Sauer | H04N 5/2257 348/148 |
| 2013/0328672 A1* | 12/2013 | Sesti | B60R 11/04 340/435 |
| 2013/0344736 A1* | 12/2013 | Latunski | H01R 13/521 439/587 |
| 2014/0103624 A1 | 4/2014 | Breed | |
| 2014/0138140 A1 | 5/2014 | Sigle | |
| 2014/0320636 A1* | 10/2014 | Bally | H04N 7/181 348/113 |
| 2014/0362209 A1* | 12/2014 | Ziegenspeck | H04N 7/10 348/113 |
| 2014/0373345 A1* | 12/2014 | Steigerwald | H04N 5/2252 29/739 |
| 2015/0222795 A1* | 8/2015 | Sauer | H04N 5/2257 348/148 |
| 2015/0264234 A1* | 9/2015 | Wang | H04N 5/2254 348/148 |
| 2015/0266430 A1* | 9/2015 | Mleczko | B60R 11/04 348/148 |
| 2015/0325964 A1* | 11/2015 | Kunieda | H01R 24/38 439/578 |
| 2015/0335230 A1 | 11/2015 | Tomatsu | |
| 2015/0365569 A1 | 12/2015 | Mai et al. | |
| 2016/0037028 A1 | 2/2016 | Biemer | |
| 2016/0268716 A1 | 9/2016 | Conger et al. | |
| 2017/0133811 A1 | 5/2017 | Conger et al. | |
| 2018/0048100 A1 | 2/2018 | Moilanen | |

* cited by examiner

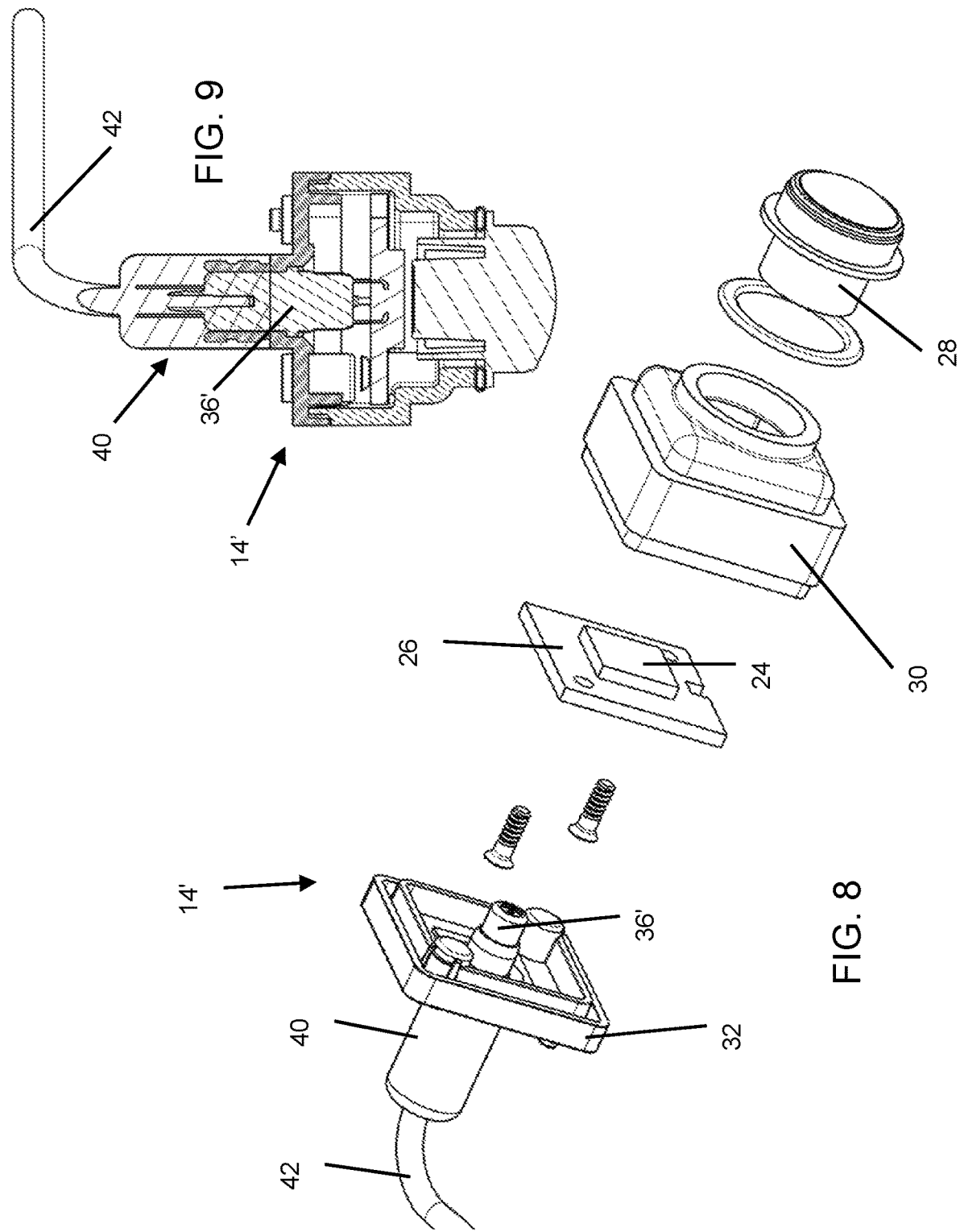

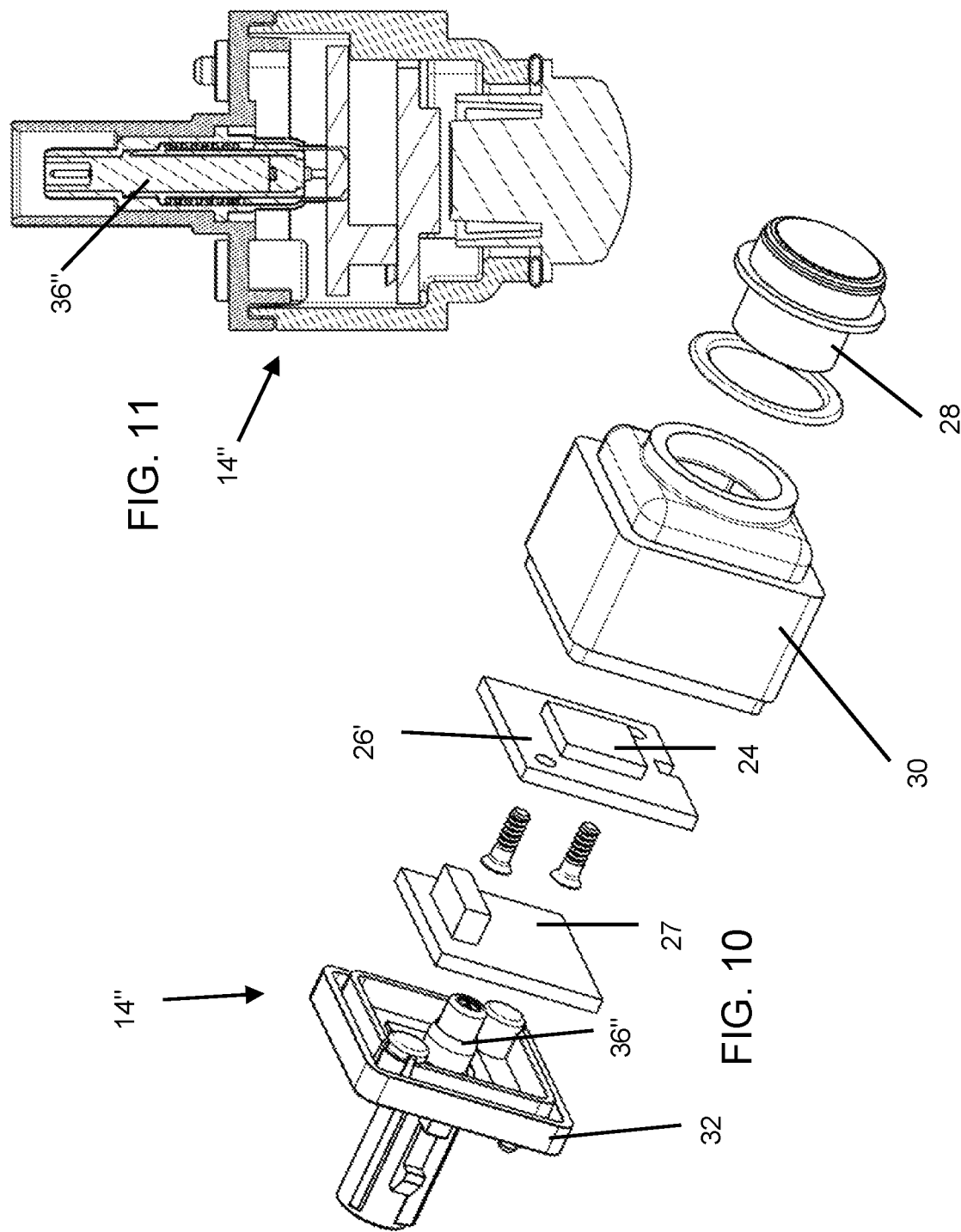

VEHICULAR CAMERA WITH COAXIAL CONNECTOR

CROSS REFERENCE TO RELATED APPLICATIONS

The present application is a continuation of U.S. patent application Ser. No. 15/722,145, filed Oct. 2, 2017, now U.S. Pat. No. 10,264,219, which claims the filing benefits of U.S. provisional application Ser. No. 62/403,456, filed Oct. 3, 2016, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vehicle camera, such as for a driver assistance system or vision system or imaging system for a vehicle, that captures image data representative of images exterior of the vehicle. The camera includes a spring-biased or spring-loaded electrical connector that electrically connects between a connector portion of the camera (configured to electrically connect to a wire harness of the vehicle or the like) and circuit pads or contacts at a circuit board of the camera. The electrical connector has an inner terminal and an outer terminal (that circumscribes the inner terminal and that is electrically isolated from the inner terminal) that engage respective inner and outer contacts at the circuit board. The spring-loaded electrical connector is initially extended and compresses as the terminals contact the contacts at the circuit board during assembly of the camera, where the spring-loaded electrical connector accommodates for axial tolerances and the contacts may be configured to accommodate lateral tolerances.

These and other objects, advantages, purposes and features of the present invention will become apparent upon review of the following specification in conjunction with the drawings.

BRIEF DESCRIPTION OF THE DRAWINGS

FIG. 8 is an exploded perspective view of another camera having a spring-loaded electrical connector, shown with the camera having a wire harness;

FIG. 9 is a sectional view of the camera of FIG. 8;

FIG. 10 is an exploded perspective view of a camera having a spring-loaded electrical connector, shown with the camera having dual printed circuit boards; and FIG. 11 is a sectional view of the camera of FIG. 10.

DESCRIPTION OF THE PREFERRED EMBODIMENTS

A camera for vehicle vision system and/or driver assist system and/or object detection system operates to capture images exterior of the vehicle and a processor may process the captured image data to display images and/or to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
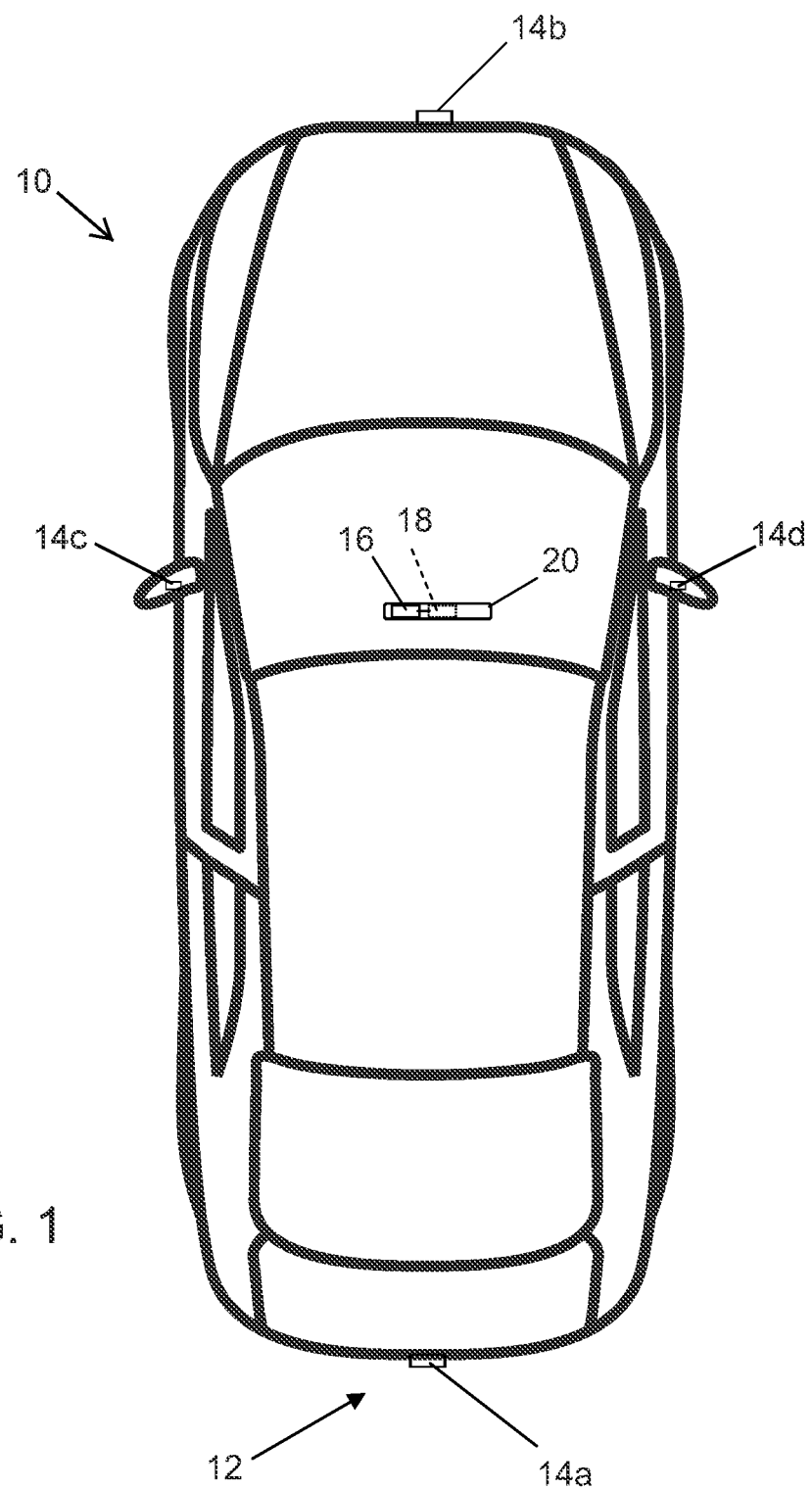
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 3:
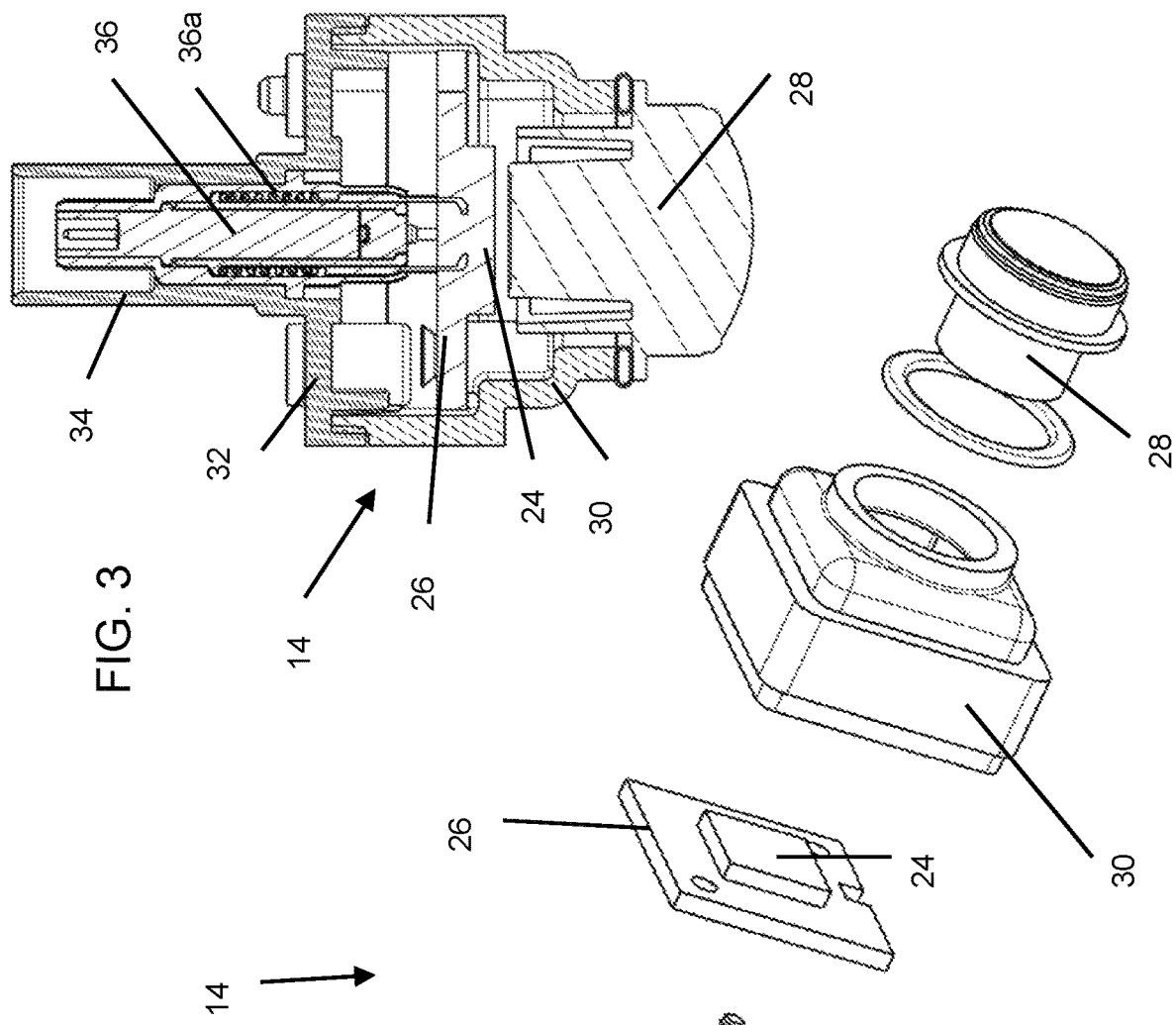
FIG. 3 is a sectional view of the camera of FIG. 2.
Figure 2:
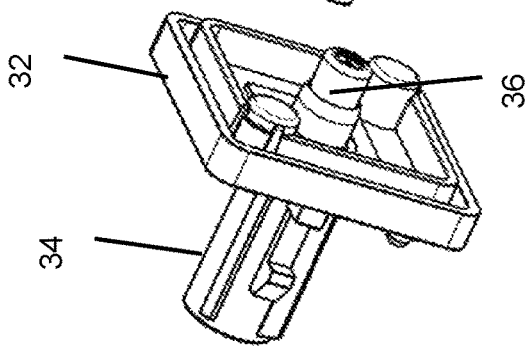
FIG. 2 is an exploded perspective view of a camera having a spring-loaded electrical connector.

As shown in FIGS. 2 and 3, the camera 14 comprises an imager 24 disposed at a circuit element or printed circuit board 26 (PCB) and a lens barrel 28 (that houses or supports a lens thereat) that is optically aligned and focused at the imager when the camera is assembled. The circuit element 26 is disposed at the rear of a front camera housing 30 and may be fastened to or bonded to the front camera housing 30. The front camera housing 30 receives the lens barrel thereat (and may be adhesively bonded to the lens barrel after the lens is optically aligned with the imager, such as by utilizing aspects of the cameras and methods described in U.S. Pat. Nos. 9,451,138; 9,277,104 and/or 8,542,451, which are hereby incorporated herein by reference in their entireties). A rear camera housing 32 is mated at a rear of the front camera housing 30 to encase the circuit element and imager in the camera housing. The rear camera housing 32 includes a connector portion 34 (such as a plastic plug or socket portion configured to connect to a connector of a wire harness of the vehicle), with a spring-loaded or spring-biased electrical connector 36 disposed therein and adjustable to engage circuitry or pads of the circuit element 26 and maintain engagement during and after assembly of the camera, as discussed below.

Figure 4:
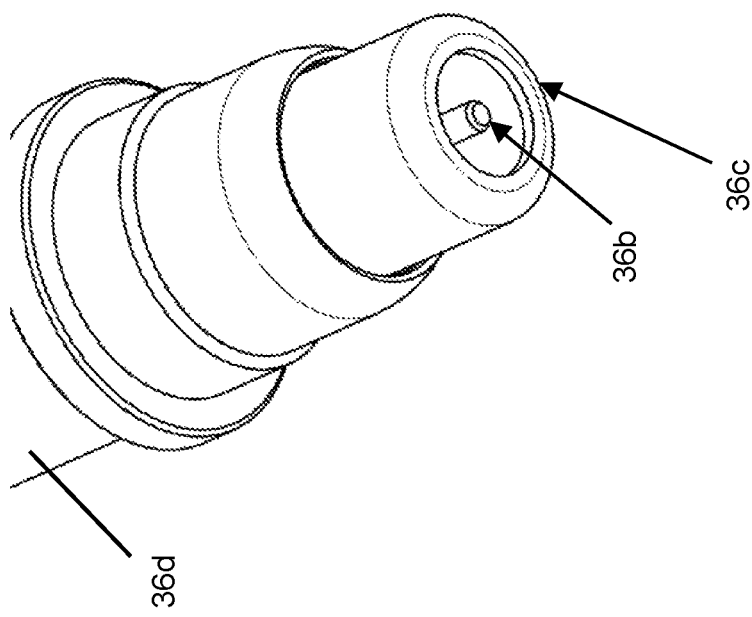
FIG. 4 is an enlarged perspective view of a contact end of the spring-loaded electrical connector.

The spring-loaded electrical connector or terminal 36 comprises an inner contact and an outer contact (see FIG. 4), both electrically conductive and electrically insulated from each other. Both contacts are spring loaded and are able to be compressed in an axial direction independently from each other (in other words, the inner contact may move relative to the outer contact). The outer contact fully encompasses the inner contact so as to create a shield around the inner contact. The outer contact may have interface features for mounting and may electrically contact the mounting structure or geometry if desired. The mating un-sprung end of the terminal may have an interface designed to mate to various industry standard high speed data interfaces, as discussed below.

Figure 5:
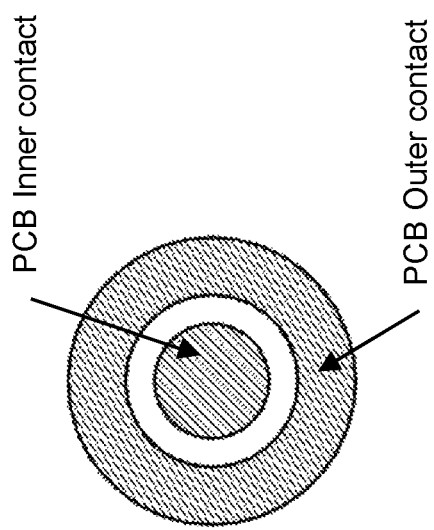
FIG. 5 is a plan view of the inner and outer contacts or pads at the printed circuit board of the camera.

As can be seen in FIG. 3, the spring-loaded connector or terminal 36 is installed into the rear camera housing, where a spring or springs 36a urges the inner contact 36b and outer contact 36c outward towards the circuit element where the contacts react against the PCB surface which has exposed electrically conductive pads (see FIG. 5). The inner and outer diameters of each of the conductive pads provides a width or area of the pads that is larger than the size of the contact surface area of the respective terminals so as to allow for side-to-side translation (XY compliance) of the PCB relative to the camera housing, while the spring action of the pin allows for axial translation (Z compliance) of the terminals relative to the PCB. The camera construction may use ultrasonic welding or may be joined via other joining methods or means, such as adhesive or laser welding could also or otherwise be used. The drawings show an example of a camera construction with focus adhesive external to the camera, but the connection method described here could also be used on cameras with the focus adhesive internal to the camera or on cameras that do not use adhesive for focus but use some other means to maintain focus.

Optionally, the housing and/or the lens holder may comprise a thermally conductive plastic or metal to dissipate heat. If the housing is electrically conductive, the spring-loaded terminal may contact the housing for EMI isolation. If it is not electrically conductive, a metalized coating may be added to the housing, which would then make contact with the spring-loaded terminal.

Figure 6:
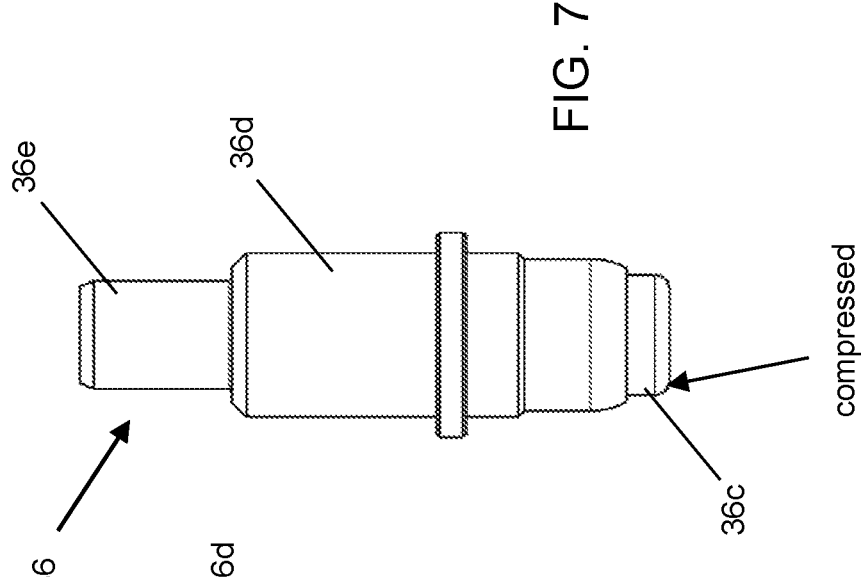
FIG. 6 is a side elevation of the spring-loaded electrical connector, shown in an extended state.
Figure 7:
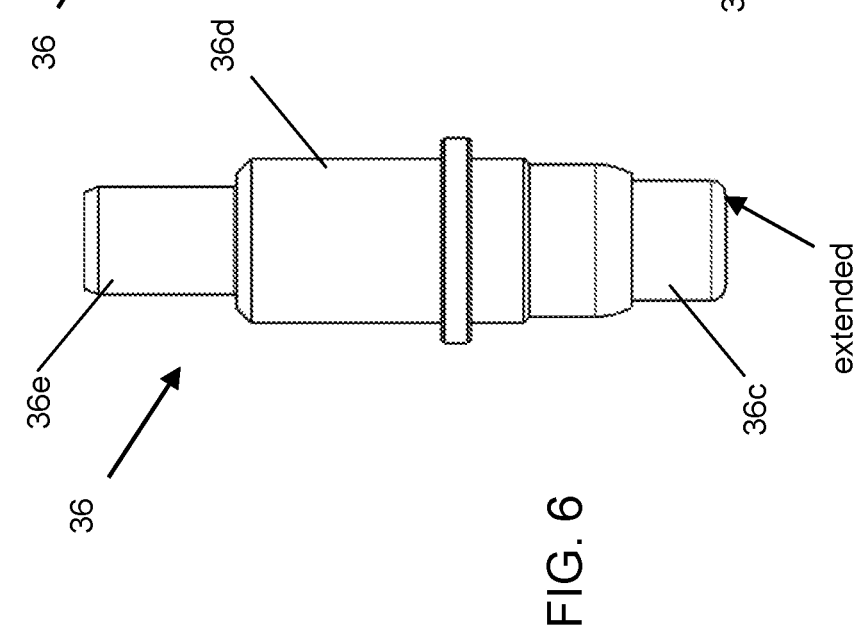
FIG. 7 is another side elevation of the spring-loaded electrical connector, shown in a compressed state.

The spring-loaded electrical connector 36 may be attached at the rear camera housing via any suitable means. For example, a base portion 36d (FIGS. 6 and 7) of the electrical connector 36 may be press-fit into the connector portion 34 of the rear camera housing 32 or may snap-attach (or otherwise attach) at the connector portion 34, whereby the inner and outer terminals 36b, 36c extend from and are spring-biased outward from the base portion 36d. The terminals 36b, 36c are thus movable (extendable and compressible) relative to the base portion 36d, which is fixedly attached at the rear camera housing, such that the terminals extend from the rear camera housing and engage the PCB at the front camera housing when the camera housings are joined together during assembly of the camera.

The joint between the front camera housing (or lens holder) and rear camera housing (or cover) may be closed via laser welding, ultrasonic welding or adhesive, or the housings or portions may be fastened together (such as via one or more screws) with a gasket. The lens holder or front camera housing may be deep (i.e., may have a deeper cavity or recess than the cavity or recess of the rear camera housing), putting the joint at or near the rear of the camera, or alternatively the rear cover or rear camera housing may be deep (i.e., may have a deeper cavity or recess than the cavity or recess of the lens holder or front camera housing), putting the joint at or near the front of the camera. There are benefits to each such as heat dissipation or ease of assembly. The joining means may comprise any suitable joining means so as to hold the front and rear camera housings together and to limit or preclude water or moisture ingress into the camera housing.

The spring-loaded terminal or pin or connector 36 may have any required mating geometry at the other end 36e (the end opposite the contact surfaces that engage and contact the pads at the PCB). For example, the spring-loaded connector 36 in FIG. 3 has an SMB interface 36e for a Fakra connector. Optionally, and such as shown in FIGS. 8 and 9, there may be a coaxial wire crimp 40 for a camera 14' that contains a harness 42, with the spring-loaded connector or terminal 36' disposed at the wire crimp and electrically connected to wires or conductive elements of the harness. The joining method of the harness may be done by overmolding, or it may be a separately fastened piece. Optionally, and such as shown in FIGS. 10 and 11, a spring-loaded connector or terminal 36" may be suitable for use for a camera 14" having dual circuit boards or PCBs (shown with the front camera housing being deeper to accommodate the dual circuit boards), where the spring-loaded terminal 36" is urged into engagement with circuit pads at the rear of a rear circuit board 27, which is electrically connected to an imager circuit board 26'. The cameras 14, 14', 14" are otherwise similar and are shown with like reference numbers for common or similar elements, such that a detailed discussion of the cameras need not be repeated herein.

Thus, the camera includes a spring-loaded or spring-biased electrical connector or terminal that is disposed at a connector portion of a rear camera housing and that has an outer connector or terminal or contact and an inner connector or terminal or contact that are urged towards and into engagement with respective outer and inner contacts or pads at a printed circuit board of the camera. The spring-bias of the terminals of the connector maintains electrical connection between the inner and outer terminals and the respective PCB contacts and allows for or accommodates tolerances in the location of the PCB relative to the rear camera housing. The PCB contacts may also be sized to allow for lateral movement of the contacts of the spring-loaded connector relative to the PCB to allow for or accommodate side-to-side location tolerances of the PCB relative to the rear camera housing.

Any suitable electrically connecting surfaces may be used to electrically connect the contact ends of the connector terminals with the respective PCB contacts. Optionally, the interface surfaces of the inner and outer contacts may be changed or adapted or configured as desired without departing from the principles of the present invention. For example, a smooth surface may be desired at the contact end for contacting an ENIG (Electroless nickel immersion gold)

plated PCB, or a jagged or serrated edge or surface may be desired at the contact end for biting or digging into solder that has been reflowed over the PCB electrical contacts.

Thus, the camera and assembly process of the present invention provides a camera with enhanced electrical connection to circuitry of the camera circuit board. The connector provides enhanced electrical connection between a coaxial connector of a vehicle wire or cable and the circuitry via the spring-biased terminals or elements of the connector.

A method of assembling the vehicular vision system camera includes providing a lens comprising a plurality of optical elements and disposing the lens in a lens barrel, and providing a front camera housing, a rear camera housing, and a printed circuit board having an imager disposed thereat. A spring-loaded electrical connector is disposed at the rear camera housing, such as via a press-fit engagement or via overmolding a portion of the rear camera housing over the spring-loaded electrical connector. The spring-loaded electrical connector comprises an inner terminal and an outer terminal for connecting to respective ones of an inner contact and an outer contact at the printed circuit board, with the outer terminal circumscribing the inner terminal. The inner and outer terminals of the electrical connector are spring-biased towards an extended state and compressible towards a compressed state. The lens barrel is accommodated at the front camera housing and the printed circuit board is disposed at the front camera housing. The assembly process includes attaching the rear camera housing at the front camera housing to enclose the printed circuit board within the camera with the lens optically aligned with the imager. The step of attaching the rear camera housing at the front camera housing comprises (i) moving the rear camera housing toward engagement with the front camera housing so that the inner and outer terminals of the electrical connector, in their extended state, engage the inner and outer contacts at the printed circuit board, and (ii) engaging the rear camera housing with the front camera housing so that the inner and outer terminals of the electrical connector compress towards their compressed state. After the rear camera housing is attached at the front camera housing, the inner and outer terminals of the electrical connector are in spring-biased electrical connection with the inner and outer contacts at the printed circuit board.

The camera may utilize aspects of the cameras and systems described in U.S. Publication Nos. US-2017-0205679; US-2017-0129419; US-2017-0054881; US-2017-0048463 and/or US-2015-0365569, which are hereby incorporated herein by reference in their entireties.

The camera may include aspects of other electrical connecting elements that accommodate tolerances in the housing and/or PCB mounting and/or connector portion. The electrical connecting elements may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569; US-2016-0037028; US-2016-0268716; US-2017-0133811 and/or US-2017-0201661, and/or U.S. patent application Ser. No. 15/487,459, filed Apr. 14, 2017, and/or Ser. No. 15/478,274, filed Apr. 4, 2017, now U.S. Pat. No. 10,142,532, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276;

US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera, said vehicular camera comprising:
a front camera housing, said front camera housing accommodating a lens and an imager;
wherein said lens comprises a plurality of optical elements;
a rear camera housing;
a printed circuit board;
wherein said rear camera housing attaches at said front camera housing to enclose said printed circuit board within said vehicular camera with said lens optically aligned with said imager;
wherein said printed circuit board has a first electrical contact element and a second electrical contact element disposed thereat, and wherein said first and second electrical contact elements are established at said printed circuit board and are in electrical conductive continuity with respective electrically conductive traces of said printed circuit board, and wherein said second electrical contact element at least partially circumscribes said first electrical contact element;
an electrical connector disposed at a connector portion of said rear camera housing, wherein said electrical connector comprises a first terminal and a second terminal for connecting to respective ones of said first electrical contact element and said second electrical contact element at said printed circuit board, and wherein said first terminal comprises a first contact surface at its end that is distal from said connector portion of said rear camera housing, and wherein said second terminal comprises a second contact surface at its end that is distal from said connector portion of said rear camera housing;
wherein said second terminal at least partially circumscribes said first terminal;
wherein said first and second terminals of said electrical connector are spring-biased towards an extended state, and wherein said first and second terminals of said electrical connector are compressible towards a compressed state;
wherein, as said rear camera housing is moved toward engagement with said front camera housing, (i) said first contact surface of said first terminal of said electrical connector moves toward and into contact with said first electrical contact element at said printed circuit board, and (ii) said second contact surface of said second terminal of said electrical connector moves toward and into contact with said second electrical contact element at said printed circuit board;
wherein, as said rear camera housing is moved toward engagement with said front camera housing, said first and second contact surfaces of the respective ones of said first and second terminals of said electrical connector, with said first and second terminals in their extended state, engage the respective one of said first and second electrical contact elements at said printed circuit board, and wherein, as said rear camera housing engages said front camera housing, said first and second terminals of said electrical connector compress towards their compressed state and, after said rear camera housing is attached at said front camera housing, are in spring-biased electrical connection with said first and second electrical contact elements at said printed circuit board;
wherein, with said rear camera housing attached at said front camera housing, and with said first and second contact surfaces of said first and second terminals in spring-biased electrical connection with said first and second electrical contact elements at said printed circuit board, electrical connection integrity is maintained via the spring-biased direct contact of said first and second contact surfaces to said first and second electrical contact elements without soldering at said printed circuit board; and
wherein said electrical connector comprises a connector end that is opposite said first and second terminals and that is configured to electrically connect to a coaxial connector of a coaxial cable of a vehicle equipped with said vehicular camera.

2. The vehicular camera of claim 1, wherein said first and second terminals are individually spring-biased via respective springs.

3. The vehicular camera of claim 1, wherein said first and second electrical contact elements are dimensioned to accommodate lateral tolerances to allow for lateral variations in electrical connection with said first and second terminals, respectively.

4. The vehicular camera of claim 1, wherein a base portion of said electrical connector is press-fit into said rear camera housing to secure said base portion relative to said rear camera housing.

5. The vehicular camera of claim 1, wherein said rear camera housing is overmolded over and at least partially along a base portion of said electrical connector to secure said base portion relative to said rear camera housing.

6. The vehicular camera of claim 1, wherein said first and second electrical contact elements comprise first and second electrically conductive pads, respectively.

7. The vehicular camera of claim 6, wherein said first and second electrically conductive pads comprise respective electrically conductive surfaces.

8. The vehicular camera of claim 1, wherein said imager is disposed at a side of said printed circuit board that is opposite the side where said first and second electrical contact elements are disposed.

9. The vehicular camera of claim 1, wherein said imager is disposed at a second printed circuit board that is attached at said front camera housing, and wherein circuitry of said printed circuit board is electrically connected to circuitry of said second printed circuit board.

10. The vehicular camera of claim 9, wherein said printed circuit board is attached at said front camera housing and spaced from said second printed circuit board.

11. A method for assembling a vehicular camera, said method comprising:
   providing a front camera housing that accommodates a lens and an imager, wherein the lens comprises a plurality of optical elements;
   providing a rear camera housing;
   providing a printed circuit board, wherein the printed circuit board has a first electrical contact element and a second electrical contact element disposed thereat, and wherein the first and second electrical contact elements are established at the printed circuit board and are in electrical conductive continuity with respective electrically conductive traces of the printed circuit board, and wherein the second electrical contact element at least partially circumscribes the first electrical contact element;
   providing an electrical connector at a connector portion of the rear camera housing, wherein the electrical connector comprises a first terminal and a second terminal, and wherein the first terminal comprises a first contact surface at its end that is distal from the connector portion of the rear camera housing, and wherein the second terminal comprises a second contact surface at its end that is distal from the connector portion of the rear camera housing, and wherein the second terminal at least partially circumscribes the first terminal, and wherein the first and second terminals of the electrical connector are spring-biased towards an extended state, and wherein the first and second terminals of the electrical connector are compressible towards a compressed state;
   moving the rear camera housing toward engagement with the front camera housing;
   as the rear camera housing moves toward engagement with the front camera housing, (i) moving the first contact surface of the first terminal of the electrical connector toward and into contact with the first electrical contact element at the printed circuit board and (ii) moving the second contact surface of the second terminal of the electrical connector toward and into contact with the second electrical contact element at the printed circuit board;
   as the rear camera housing further moves into engagement with the front camera housing, compressing the first and second terminals of the electrical connector towards their compressed state and are in spring-biased electrical connection with the first and second electrical contact elements at the printed circuit board;
   attaching the rear camera housing at the front camera housing;
   with the rear camera housing attached at the front camera housing, and with the first and second contact surfaces of the first and second terminals in spring-biased electrical connection with the first and second electrical contact elements at the printed circuit board, maintaining electrical connection integrity via the spring-biased direct contact of the first and second contact surfaces to the first and second electrical contact elements without soldering at the printed circuit board; and
   wherein the electrical connector comprises a connector end that is opposite the first and second terminals and that is configured to electrically connect to a coaxial connector of a coaxial cable of a vehicle equipped with the vehicular camera.

12. The method of claim 11, wherein the first and second terminals are individually spring-biased via respective springs.

13. The method of claim 11, wherein the first and second electrical contact elements are dimensioned to accommodate lateral tolerances to allow for lateral variations in electrical connection with the first and second terminals, respectively.

14. The method of claim 11, comprising press-fitting a base portion of the electrical connector into the rear camera housing to secure the base portion and electrical connector relative to the rear camera housing.

15. The method of claim 11, comprising overmolding the rear camera housing over and at least partially along a base portion of the electrical connector to secure the base portion and electrical connector relative to the rear camera housing.

16. The method of claim 11, wherein said first and second electrical contact elements comprise first and second electrically conductive pads, respectively.

17. The method of claim 11, wherein the imager is disposed at a side of the printed circuit board that is opposite the side where the first and second electrical contact elements are established.

18. The method of claim 11, wherein the imager is disposed at a second printed circuit board that is attached at the front camera housing, and wherein circuitry of the printed circuit board is electrically connected to circuitry of the second printed circuit board.

19. The method of claim 18, wherein the printed circuit board is attached at the front camera housing and spaced from the second printed circuit board.

20. A vehicular camera, said vehicular camera comprising:
   a front camera housing, said front camera housing accommodating a lens and an imager;
   wherein said lens comprises a plurality of optical elements;
   a rear camera housing;
   a printed circuit board;

wherein said rear camera housing attaches at said front camera housing to enclose said printed circuit board within said vehicular camera with said lens optically aligned with said imager;

wherein said printed circuit board has a first electrically conductive pad and a second electrically conductive pad, and wherein said first and second electrically conductive pads are established at a surface of said printed circuit board and are in electrical conductive continuity with respective electrically conductive traces of said printed circuit board, and wherein said second electrically conductive pad at least partially circumscribes said first electrically conductive pad;

wherein said first and second electrically conductive pads comprise respective electrically conductive surfaces;

an electrical connector disposed at a connector portion of said rear camera housing, wherein said electrical connector comprises a first terminal and a second terminal for connecting to respective ones of said first electrically conductive pad and said second electrically conductive pad at said printed circuit board, and wherein said first terminal comprises a first contact surface at its end that is distal from said connector portion of said rear camera housing, and wherein said second terminal comprises a second contact surface at its end that is distal from said connector portion of said rear camera housing;

wherein said second terminal at least partially circumscribes said first terminal;

wherein said first and second terminals of said electrical connector are spring-biased towards an extended state, and wherein said first and second terminals of said electrical connector are compressible towards a compressed state;

wherein, as said rear camera housing is moved toward engagement with said front camera housing, (i) said first contact surface of said first terminal of said electrical connector moves toward and into contact with said first electrically conductive pad at said printed circuit board, and (ii) said second contact surface of said second terminal of said electrical connector moves toward and into contact with said second electrically conductive pad at said printed circuit board;

wherein, as said rear camera housing is moved toward engagement with said front camera housing, said first and second contact surfaces of the respective ones of said first and second terminals of said electrical connector, with said first and second terminals in their extended state, engage the respective one of said first and second electrically conductive pads at said printed circuit board, and wherein, as said rear camera housing engages said front camera housing, said first and second terminals of said electrical connector compress towards their compressed state and, after said rear camera housing is attached at said front camera housing, are in spring-biased electrical connection with said first and second electrically conductive pads at said printed circuit board;

wherein, with said rear camera housing attached at said front camera housing, and with said first and second contact surfaces of said first and second terminals in spring-biased electrical connection with said first and second electrically conductive pads at said printed circuit board, electrical connection integrity is maintained via the spring-biased direct contact of said first and second contact surfaces to said first and second electrically conductive pads without soldering at said printed circuit board;

wherein said first and second electrically conductive pads are dimensioned to accommodate lateral tolerances to allow for lateral variations in electrical connection with said first and second terminals, respectively;

wherein said electrical connector comprises a connector end that is opposite said first and second terminals and that is configured to electrically connect to a coaxial connector of a coaxial cable of a vehicle equipped with said vehicular camera; and wherein said electrical connector has a base portion that is secured relative to said connector portion of said rear camera housing via one selected from the group consisting of (i) said base portion being press-fit into said connector portion of said rear camera housing and (ii) said connector portion of said rear camera housing being overmolded over and at least partially along said base portion.

21. The vehicular camera of claim 20, wherein said first and second terminals are individually spring-biased via respective springs.

22. The vehicular camera of claim 20, wherein said imager is disposed at a side of said printed circuit board that is opposite the side where said first and second electrically conductive pad are established.

23. The vehicular camera of claim 20, wherein said imager is disposed at a second printed circuit board that is attached at said front camera housing, and wherein circuitry of said printed circuit board is electrically connected to circuitry of said second printed circuit board, and wherein said printed circuit board is attached at said front camera housing and spaced from said second printed circuit board.

* * * * *